(12) United States Patent
Foucault et al.

(10) Patent No.: US 6,227,596 B1
(45) Date of Patent: May 8, 2001

(54) SLIDE RAIL FOR VEHICLE SEAT AND SEAT COMPRISING SUCH A SLIDE RAIL

(75) Inventors: Laurent Foucault, Tesse la Madeleine; Hervé Calor, Messei, both of (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/273,435

(22) Filed: Mar. 22, 1999

(30) Foreign Application Priority Data

Mar. 24, 1998 (FR) .................................................. 98 03597

(51) Int. Cl.⁷ .............................. B60N 2/00; B60N 2/02; F16M 13/00; A47C 1/00
(52) U.S. Cl. ....................... 296/65.13; 297/341; 248/429
(58) Field of Search ............. 296/65.13, 65.14, 296/65.16, 65.01; 297/341; 248/429, 430

(56) References Cited

U.S. PATENT DOCUMENTS

| | | | |
|---|---|---|---|
| 4,143,911 | * 3/1979 | Sakakibara et al. ............... | 296/65.14 |
| 4,639,038 | * 1/1987 | Heling ................................ | 297/341 |
| 4,648,657 | * 3/1987 | Cox et al. .......................... | 297/341 |
| 4,652,052 | * 3/1987 | Hessler et al. .................... | 297/341 |
| 4,707,030 | * 11/1987 | Harding .............................. | 297/341 |
| 4,881,774 | * 11/1989 | Bradley et al. .................... | 297/341 |
| 4,881,827 | * 11/1989 | Borlinghaus et al. ............. | 297/341 |
| 5,352,019 | * 10/1994 | Bauer et al. ....................... | 297/341 |
| 5,531,503 | * 7/1996 | Hughes ............................... | 297/341 |
| 5,547,159 | * 8/1996 | Treichl et al. ..................... | 248/429 |
| 5,605,377 | * 2/1997 | Tame .................................. | 297/341 |
| 5,626,392 | * 5/1997 | Bauer et al. ....................... | 297/341 |
| 5,641,145 | 6/1997 | Droulon et al. ................... | 248/429 |
| 5,676,341 | * 10/1997 | Tarusawa et al. ................. | 296/65.13 |
| 5,688,026 | 11/1997 | Reubeuze et al. ................ | 297/341 |
| 5,820,216 | * 10/1998 | Feuillet ............................... | 297/341 |
| 5,873,629 | * 2/1999 | Schuler .............................. | 297/341 |
| 5,899,532 | * 5/1999 | Paisley et al. .................... | 297/341 |
| 5,944,383 | * 8/1999 | Mathey et al. .................... | 297/341 |
| 5,984,254 | * 11/1999 | Baloch et al. .................... | 296/65.14 |
| 6,048,030 | * 4/2000 | Kanda et al. ..................... | 297/341 |
| 6,098,946 | * 8/2000 | Sechet et al. ..................... | 248/429 |

FOREIGN PATENT DOCUMENTS

| | | | |
|---|---|---|---|
| 4201829 A1 | * 6/1993 | (DE) ................................... | 297/341 |
| 0 683 066 | 11/1995 | (EP) . | |
| 0 691 237 | 1/1996 | (EP) . | |
| 0 723 889 | 7/1996 | (EP) . | |
| 91427 | * 7/1980 | (JP) ..................................... | 297/341 |
| WO 97/03860 | 2/1997 | (WO) . | |

OTHER PUBLICATIONS

French Preliminary Search Report dated Jan. 25, 1999, Appl. No. FR 9805952.

* cited by examiner

Primary Examiner—D. Glenn Dayoan
Assistant Examiner—Hilary Gutman
(74) Attorney, Agent, or Firm—Marshall, O'Toole, Gerstein, Murray & Borun

(57) ABSTRACT

A slide rail for a vehicle seat, comprising a fixed section, a mobile section, a memory retaining runner sliding along the fixed section and defining a memorized position of the mobile section, a runner catch, a first control to simultaneously unlock the slide rail and clip the runner to the mobile section, and a second control to only unlock the slide rail. The runner catch is brought resiliently to its unlocked position, and it is moved into its locked position by engagement with a cam surface integral with the mobile section, only when this mobile section leaves its memorized position or returns into said memorized position.

13 Claims, 5 Drawing Sheets

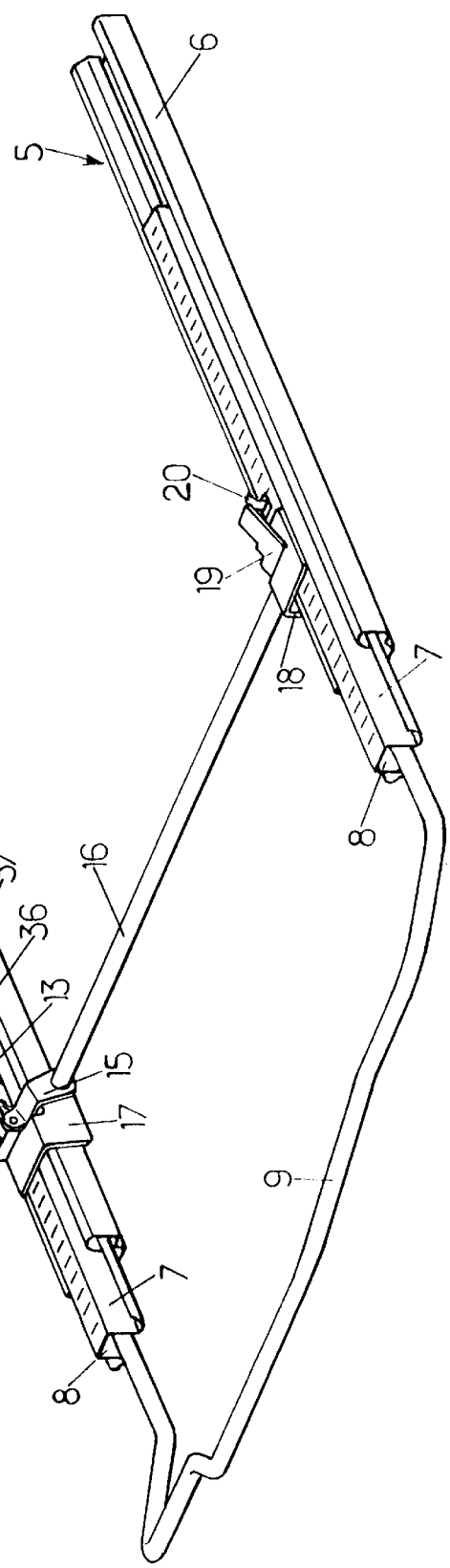

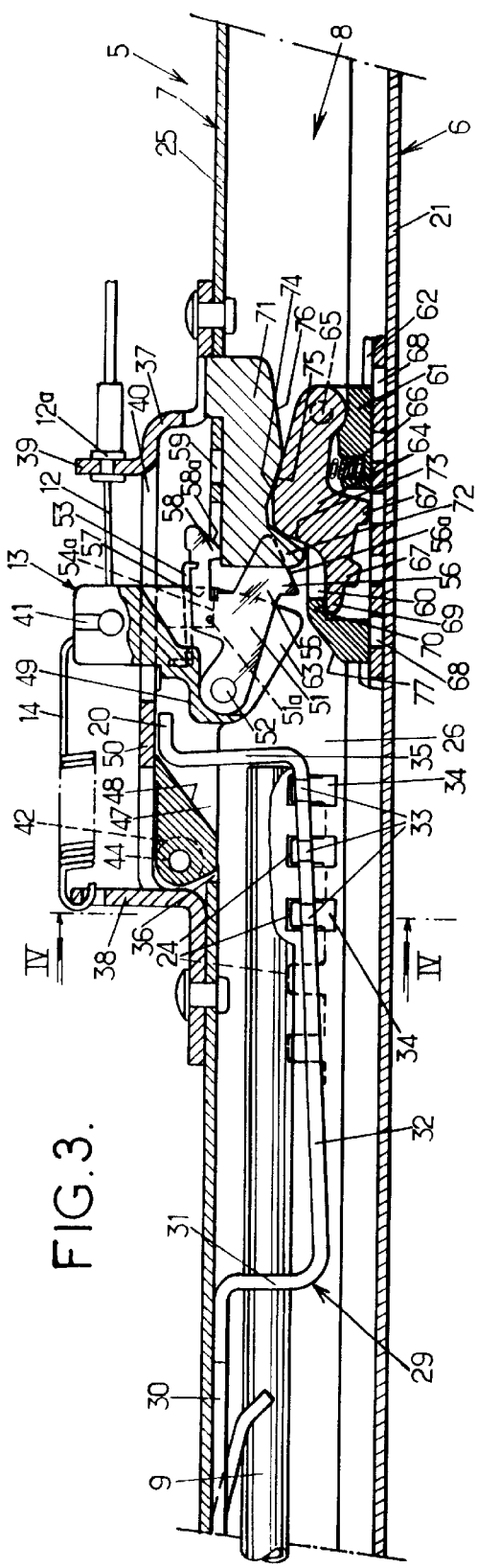
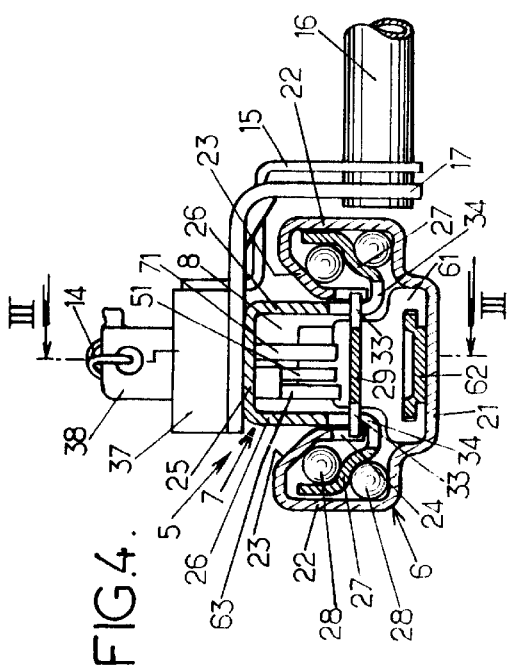
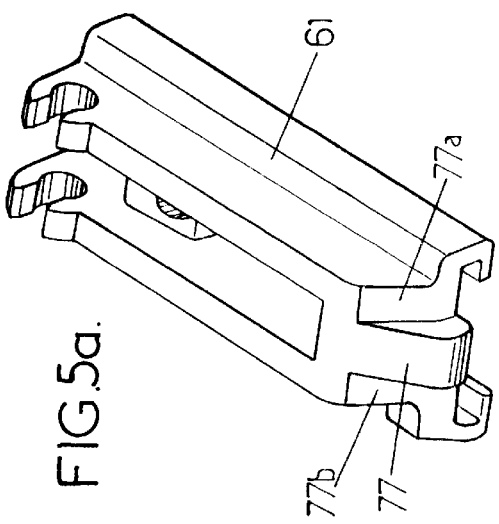

SLIDE RAIL FOR VEHICLE SEAT AND SEAT COMPRISING SUCH A SLIDE RAIL

FIELD OF THE INVENTION

The present invention relates to slide rails for vehicle seats and to seats comprising such slide rails.

More particularly, the invention concerns a slide rail for a vehicle seat, comprising:
- a fixed section, intended to be fixed to the vehicle,
- a mobile section, which is sliding mounted along the fixed section and which is intended to be fixed to the seat to allow movement of this seat in a so-called longitudinal direction, forwards and backwards, the mobile section delimiting with the fixed section a hollow inner space in the slide rail,
- a slide rail catch which is mounted on the mobile section and which is movable between, on the one hand, a locked position wherein said slide rail catch engages with the fixed section to lock the mobile section, and on the other hand, an unlocked position wherein said slide rail catch does not engage with the fixed section and allows said mobile section to slide, the slide rail catch being resiliently biased to its locked position,
- a memory retaining runner which is sliding mounted relative to the fixed section parallel to the longitudinal direction, this memory retaining runner being placed in the inner space of the slide rail and limiting the backward movement of the mobile section, defining in this way a memorized position of the mobile section,
- a runner catch which is carried by the memory retaining runner and which is movable between, on the one hand, a locked position wherein said runner catch engages with notches integral with the fixed section so as to immobilise the memory retaining runner relative to the fixed section, and on the other hand, an unlocked position wherein said runner catch does not immobilize the memory retaining runner,
- a runner lock-on device which is mounted on the mobile section and which is movable between, on the one hand, an attached position wherein said lock-on device fixes the memory retaining runner to the mobile section, and on the other hand, an unattached position wherein said lock-on device does not fix the memory retaining runner to the mobile section,
- first control means adapted to move simultaneously the slide rail catch from its locked position to its unlocked position and the lock-on device from its unattached position to its attached position, so as to allow simultaneous sliding of the mobile section and the memory retaining runner relative to the fixed section, either forwards or backwards, in order to adjust the memorized position of the seat,
- and second control means adapted to move the slide rail catch from its locked position to its unlocked position without moving the lock-on device into its attached position, so as to allow the mobile section to slide forwards without moving the memory retaining runner.

BACKGROUND OF THE INVENTION

Slide rails of this type are used in particular to equip the front seats of two-door vehicles. To access the rear seats of such a vehicle, the second control means are activated, generally by folding the seat back forwards, then the seat is made to slide forwards to a stop position. In order then to put the seat back into its initial position, it is made to slide backwards to its initial position, brought about by the memory retaining runner.

The document FR-A-2 695 885 describes an example of one such slide rail, wherein the memory retaining runner is simply trapped in the hollow inner space of the slide rail, this memory retaining runner comprising a tip which constitutes the runner catch and which is movable between its locked and unlocked positions by pivoting the whole runner on itself. In this known slide rail, the memory retaining runner tip is resiliently biased to its locked position by a leaf spring which is supported under the upper web of the mobile section, in such a way that this tip engages with a rack formed in the bottom of the fixed section, said rack being positioned so as to prevent the memory retaining runner from sliding backwards.

The slide rail disclosed in this document is satisfactory taken as a whole, but has nonetheless the following drawbacks:
- when the mobile section of the slide rail moved backwards after being moved forwards following activation of the second control means, the memory retaining runner may possibly lose its memorized position and move back one or more notches when the mobile section strikes violently against said memory retaining runner, which may occur in certain circumstances,
- the memory retaining runner is free so long as the mobile section is not mounted on the fixed section of the slide rail, which complicates the assembly of said slide rail,
- and sliding contact of the leaf spring under the upper web of the mobile section presupposes that said web has a smooth sliding track, which imposes an additional constraint on the design of the slide rail.

OBJECTS AND SUMMARY OF THE INVENTION

A particular object of the present invention is to overcome these drawbacks.

To this end, according to the invention, a slide rail of the type in question is essentially characterised:
- in that the memory retaining runner engages by friction fitting, with a longitudinal guide integral with the fixed section,
- and in that the mobile section of the slide rail comprises a wedge which projects into the hollow inner space of said slide rail, this wedge having a cam surface which is adapted to engage with a support surface belonging to the runner catch, said cam surface being configured so as to leave the runner catch in its unlocked position when the mobile section of the slide rail is in its memorized position, and to move the runner catch into its locked position when the mobile section is not in its memorized position, at least when said mobile section leaves its memorized position or returns to said memorized position, and the friction between the memory retaining runner and the corresponding guide being significant enough for the action of the wedge cam surface on the runner catch support surface not to cause any longitudinal sliding of the memory retaining runner.

By means of these arrangements, the runner catch is kept positively in its locked position when the mobile section of the slide rail leaves its memorized position or returns to said memorized position, i.e. at the exact moment when the memory retaining runner could lose the memorized position owing to its engagement with other components of the slide rail. Effective memory retention of the last setting position of the slide rail is thus guaranteed, using straightforward and inexpensive means.

Furthermore, the memory retaining runner is held by its guide even before assembly of the mobile section on the fixed section, which facilitates the assembly of the slide rail.

Lastly, the present invention does not require any sliding contact between a component of the memory retaining runner and the upper web of the mobile section, which simplifies the design of the slide rail.

In preferred versions of the invention, use may be possibly made additionally of one and/or other of the following arrangements:

the wedge cam surface is configured to move the runner catch into its locked position only when the mobile section of the slide rail is shifted forwards from its memorized position, to a distance from said memorized position less than a pre-specified distance, which pre-specified distance is less than 1 cm, in such a way that the runner catch is in its locked position only when the mobile section has just left its memorized position or is returning to said memorized position;

the slide rail catch is a resilient metal part contained in the hollow inner space of said slide rail;

the fixed section comprises a horizontal bottom which carries the memory retaining runner, the mobile section having a horizontal upper web which is integral with said wedge and which carries a slider mounted to slide longitudinally relative to said mobile section between front and rear positions, this slider having a front end and a rear end, and the front end of said slider being pivoting mounted relative to the mobile section around a first horizontal transverse axis, in such a way that this slider is movable between a position parallel to said mobile section and a position inclined towards the hollow inner space of the slide rail, said rear end carrying a clip which is pivoting mounted relative to said slider around a second transverse horizontal axis, between high and low positions, this clip being pulled resiliently towards its low position and having a downward pointing tip which is adapted to penetrate in a housing belonging to the memory retaining runner when the slider is in its inclined position relative to the mobile section and when said mobile section is in its memorized position, the slider and its clip thus forming said lock-on device, the slider comprising additionally a cam surface which engages with the slide rail catch to move said slide rail catch from its locked position to its unlocked position when the slider moves from its front position to its rear position under the action of the second control means, the slide rail comprising furthermore a support sill which is adapted to act on an additional support surface belonging to the slider when the slide rail catch is moved into its unlocked position under the action of the first control means, and the slider being resiliently biased to both its rear position and its horizontal position;

the slider is pulled to both its rear position and its horizontal position by the same tension spring which is mounted between on the one hand, a support lug which is integral with the mobile section of the slide rail and which is placed above the level of the pivoting axis of the slider, and on the other hand, an upper lock-on head placed towards the front end of said slider;

the clip is configured to engage in the housing of the memory retaining runner before the slide rail catch allows the mobile section to slide, when the first control means are activated;

the clip is configured to allow the memory retaining runner to be driven forward when said clip is engaged in the corresponding housing of the runner, the memory retaining runner being furthermore in contact with a stop end integral with the mobile section when said mobile section is in its memorized position, said stop-end being placed towards the front of the memory retaining runner and allowing this runner to be driven backwards when the first control means are activated;

the clip has a rear end fitted with a cam surface which engages with the runner catch when the second control means are activated, in order to then move the runner catch into its locked position whereas the clip moves into its high position relative to the slider;

the cam surface of the clip is configured so that, when the second control means are activated, the runner catch moves into its locked position before the slide rail catch allows the mobile section to slide;

the memory retaining runner has a front edge which is configured so that, when the slider is in its inclined position and the clip is in its low position, if the clip is not engaged in the corresponding housing of the memory retaining runner, then the cam surface of said clip is adapted to slide against the inclined front edge of the memory retaining runner when the mobile section is moved backwards, thus lifting the clip until the tip of said clip is engaged in the corresponding housing of the memory retaining runner;

the clip is integral with an auxiliary tip which, when the slider is moved into its rear position under the action of the second control means, is above a housing arranged in the upper web of the mobile section, this auxiliary tip being adapted to be engaged in the corresponding housing when the mobile section leaves its memorized position and the clip cam surface ceases to engage with the memory retaining runner, said auxiliary tip being adapted to then keep the slider in its rear position until the mobile section returns to its memorized position, where the clip cam surface again raises said clip and releases the auxiliary tip from its housing.

Furthermore, another object of the invention is a vehicle seat comprising a seat part mounted to slide longitudinally by means of at least one slide rail as defined above, the seat part being fixed to the mobile section of the slide rail.

Lastly, yet another object of the invention is a vehicle seat comprising a seat part mounted to slide longitudinally by means of at least a first slide rail as defined above and a second slide rail also including a fixed section, a mobile section and a slide rail catch movable between locked and unlocked positions, the seat part of the seat being fixed to the mobile sections of the slide rails, the slider of the first slide rail being connected by means of a link, to a transverse connection bar which is pivoting mounted on the mobile sections of the two slide rails and which comprises a support sill engaging with the slide rail catch of the second slide rail to move said second slide rail catch into its unlocked position when the second control means are activated.

BRIEF DESCRIPTION OF THE DRAWINGS

Other characteristics and advantages of the invention will emerge from the following description of one of its versions, given as a non-restrictive example, in relation to the appended drawings.

In the drawings:

FIG. 1 is a diagrammatic view of a vehicle seat fitted with a slide rail according to one version of the invention, FIG. 2 is a perspective view showing the slide rails of the seat in FIG. 1, FIG. 3 is a longitudinal cross-section view of one of the slide rails in FIG. 2, in the off position, the cross-section being taken along the line III—III in FIG. 4.

FIG. 4 is a cross-section view along the line IV—IV in FIG. 3,

FIG. 5a is a front perspective view of the memory retaining runner of the slide rail.

MORE DETAILED DESCRIPTION

Figure 5:
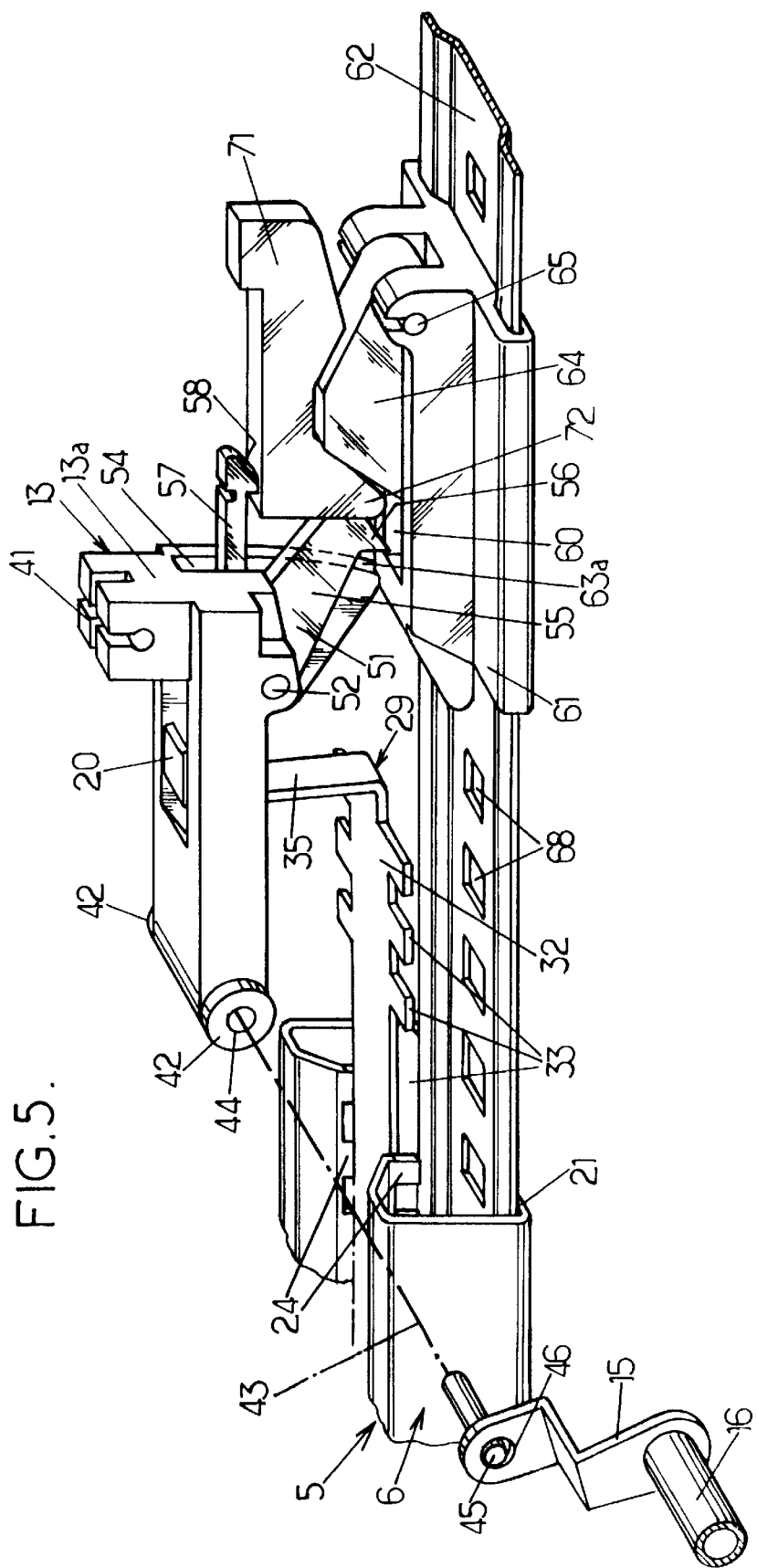
FIG. 5 is a partial cut-away diagram of the slide rail in FIGS. 3 and 4, showing the locking and memory retention mechanism of this slide rail.

In the different figures the same references denote identical or similar components.

FIG. 1 shows a seat 1, particularly a vehicle front seat, which comprises a back part 2 pivotally mounted on a seat part 3, itself fixed to the floor 4 of the vehicle by means of two parallel slide rails 5, which each extend in a so-called longitudinal direction, allowing movement of the whole seat 1 forwards and backwards.

Each slide rail 5 comprises, on the one hand, a fixed section 6 fixed to the floor 4 of the vehicle, and on the other hand, a mobile section 7 which is fixed to the seat part 3 of the seat and which is sliding by mounted on the fixed section parallel to said longitudinal direction.

The fixed and mobile sections 6,7 of each slide rail delimit between them a hollow inner space 8 (see FIG. 2), in which is housed a slide rail catch which will be described in more detail below, and which is normally in a locked position where it locks the mobile section 7 of the corresponding slide rail.

The catches of the two slide rails 5 can be unlocked simultaneously when the passenger in the seat 1 pulls upwards on a control bar 9 having a general U shape the base of which is located under the front end of the seat and the branches of which penetrate into the hollow inner spaces 8 of the two slide rails 5 to connect with the corresponding slide rail catches.

To adjust the longitudinal position of the seat, the control bar 9 is activated, which unlocks the catches of the two slide rails 5 and allows the mobile sections 7 of these two slide rails to slide. During this movement, the mobile section 7 of one of the two slide rails pulls with it a memory retaining runner which will be described below.

This memory retaining runner allows the last longitudinal position setting of the seat to be memorized, when a user wants to move the whole seat quickly to its maximum forward position, for example so as to access the rear seats in the vehicle if the seat 1 is placed at the front of a vehicle with two side doors.

When a user wants to access the rear seats or leave the rear seats of this vehicle, he/she activates for example a lever 10 (FIG. 1) or another control part which releases the seat back 2 to rotate around a transverse horizontal pivoting axis 11. The seat back 2 then pivots generally automatically forwards, under the action of a spring internal to said seat back (not shown), to a folded down forwards position.

This pivoting movement of the seat back 2 causes a pull on a sheathed cable 12, which then pulls backwards a slider 13 (FIG. 2) which is slidingly mounted in the longitudinal direction on the mobile section 7 of the slide rail which comprises the memory retaining runner, this slider 13 being normally kept in a front position by a return spring 14.

As will be explained below, the movement of the slider 13 to its rear position causes the catch of the slide rail 5 which comprises this slider to unlock. Moreover, the slider 13 also causes the pivoting of a link 15 which is integral with a transverse horizontal connection bar 16 the ends of which are pivotally mounted on flanges 17, 18 fixed respectively to the mobile sections 7 of the two slide rails.

The end of the connection bar 16 which is situated near the slide rail 5 not comprising the slider 13, is integral with a lever 19 which extends backwards and which is adapted to pivot by pressing on the rear end 20 of the corresponding slide rail catch when the slider 13 is moved to its rear position.

Thus, when the seat back 2 is folded forwards, the catches of the two slide rails are unlocked and the seat part 3 can be moved to its maximum forward position, whereas the aforementioned memory retaining runner remains in place so as to then limit the backward movement of the seat. When the seat user wants then to move the seat backwards to put it back to the position for use, the seat stops automatically in its initial position, i.e. in the last longitudinal position set by said user.

The means, which allow this result to be achieved, will now be described in more detail, in relation to FIGS. 3 to 5, which show one particular version or example of the invention.

In this example, as can be seen in FIG. 4, the fixed section of each of the two slide rails has a U shaped cross-section opening upwards, with a horizontal bottom 21 and two vertical flanges 22 which are extended inwards and downwards by two reflex troughs 23, which extend to a lower edge forming downward pointing notches 24.

Furthermore, the mobile section 7 of each of the two slide rails has a U shaped cross-section opening downwards, which comprises a horizontal upper web 25 and two vertical flanges 26 placed between the reflex troughs 23 of the fixed section. The lower ends of said vertical flanges 26 are extended upwards and outwards by two external troughs 27 which penetrate into the reflex troughs 23 of the fixed section, balls 28 being generally interposed between the fixed and mobile sections, respectively above and below each external trough 27.

As can be seen in particular in FIG. 3, the catch 29 of each slide rail is in the form of a bent and indented resilient metal blade, which extends in the longitudinal direction.

This catch 29 comprises a front end 30 which is fixed under the upper web 25 of the mobile section by welding, riveting, or the some other means, and which is extended forwards by a projection 31 extending approximately vertically downwards, then by a rear part 32 slightly inclined relative to the horizontal.

This rear part 32 is movable vertically by flexing the catch 29, and has towards its rear end side teeth 33 which extend in the transverse horizontal direction and which, in the off position, penetrate into the notches 24 in the fixed section by passing through apertures 34 arranged in the vertical flanges 26 of the mobile section.

Lastly, the rear end of the slide rail catch 29 comprises a projection 35 which extends upwards, to the rear end or support sill 20 as already mentioned for the slide rail 5 which does not comprise a slider 13.

The projection 31 of each catch 29 is passed through by one of the branches of the control bar 9, the end of this branch coming to press on the rear part 32 to move it downwards when the front part of said bar 9 is pulled up.

Furthermore, with more particular reference to the slide rail 5 which comprises the slider 13, the upper web 25 of the mobile section of this slide rail comprises a longitudinal cut 36 in which the slider 13 slides (see FIG. 3).

Above this cut is fixed a metal support part 37 which covers said cut 36 and the slider 13.

This support part 37 comprises, respectively at its front and rear ends, a front lug 38 to which is fixed one of the ends of the return spring 14, and a rear lug 39 to which is fixed one of the ends 12a of the sheath of the sheathed cable 12.

Furthermore, the support part 37 comprises a longitudinal cut 40 in which slides a head 41 of the slider 13, which projects upwards from the rear end of said slider and which is fixed both to one end of the return spring 14 and to one end of the sheathed cable 12.

Moreover, as can be seen in FIG. 5, the front end of the slider 13 comprises two cylindrical journals 42, which project laterally relative to said slider and which are preferably moulded of a single piece with the slider 13, in a plastic material.

These two journals 42 are supported on the upper web 25 of the mobile section, on either side of the cut 36, and allow the slider 13 to slide longitudinally and/or pivot around a transverse horizontal axis 43.

At the centre of these journals 42, the slider 13 is additionally passed through by a transverse horizontal bore 44 in which is engaged a metal rod 45 which penetrates into an oblong port 46 of the link rod 15.

As can be seen in FIG. 3, the slider 13 is additionally passed through vertically by a channel 47 delimited towards the front by a cam surface 48 forming a forward and downward inclined face. This channel 47 is additionally delimited towards the back by a supported surface forming an upward pointing support sill 49. The projection 35 of the slide rail catch 29 penetrates into the slider channel 47.

In the off position, a horizontal wall 50 of the support part 37 also serves as an upper stop for the slider 13, the journals 42 of which also abut forwards against the support part 37: thus, in the off position, the slider 13 extends approximately horizontally, while being pulled both upwards and forwards by the return spring 14.

As can be seen in FIGS. 3 and 5, at the rear end of the slider 13 is mounted a clip 51, which has the form of a cut plane metal sheet and which pivots on the slider 13 around a transverse horizontal axis 52. The clip 51 is pulled downward by a resilient metal wire 53 or possibly by a compression spring, and said clip is mounted in a vertical slit 54 of the slider 13 which is open downwards and backwards from said slider.

On one of the sides of the slit 54 is provided an upper broadening which forms a lower shoulder 54a (FIG. 3) engaging with a stop pin 51a formed by local stamping of the clip 51 (semi-cut) to limit the downward pivoting of said clip.

The clip 51 comprises two parts projecting backwards outside the slit 54:

on the one hand, a lower branch 55 which ends in a downward pointing main tip 56 and a cam surface 56a which extends upwards and backwards from the lower end of the tip 56, and on the other hand, an upper branch 57 which is placed above the lower branch 55 being separated from the latter, and which ends in a downward pointing auxiliary tip 58 and a cam surface 58a extending upwards and backwards from the lower end of the tip 58.

The auxiliary tip 58 is adapted to lock on in a channel 59 arranged in the upper web 25 of the mobile section, as will be described below, whereas the main tip 56 is adapted to lock-on in a housing 60 of a memory retaining runner 61 which slides longitudinally on a metal rail 62 fixed to the bottom 21 of the fixed section.

The memory retaining runner 61, which can to advantage be moulded in a plastic material, is fitted onto the rail 62 in such a way as to be able to slide longitudinally on it with friction.

Moreover, the memory retaining runner 61 carries a metal runner catch 64 which is pivotally mounted around a transverse horizontal axis 65 at the rear end of the runner 61, and which is pushed upwards by a spring 66 carried by said runner.

The runner catch 64 additionally comprises downward pointing teeth 67, which are adapted to engage in notches 68 arranged in the rail 62, the notches 68 being made either with the same pitch as the notches 24 of the fixed section, or with a pitch which is a whole multiple of the pitch of the notches 24.

In the off position, as shown in FIG. 3, the teeth 67 of the runner catch are kept disengaged from the notches 68 by the spring 66, the nose 69 of the runner catch then pressing against a stop 70 of the memory retaining runner and/or against a wedge 71 which can have for example the form of a vertical indented metal sheet fixed for example by fitting into the upper web 25 of the fixed section, this metal sheet extending in a longitudinal vertical plane shifted relative to the plane of the clip 51.

The wedge 71 comprises at its front end a stop pin 72 which is normally in contact with an approximately vertical front face 73 of the runner catch. Moreover, the wedge 71 comprises:

a first cam surface 74 which engages with an upper support surface 75 of the runner catch to keep the teeth 67 engaged in the notches 68 of the rail 62 when the mobile section 7 of the slide rail is moved forwards to access the rear seats of the vehicle, and a second cam surface 76 which is configured to engage with the front edge of the upper support surface 75 of the runner catch to make this catch pivot into its locked position when the mobile section 7 of the slide rail returns to its initial position after the rear seat of the vehicle have been accessed.

The cam surfaces 74,76 are sufficiently inclined to make the runner catch 64 pivot without the runner 61 sliding on its rail, in view of the coefficient of friction between the runner and the rail.

Lastly, as can be seen in FIG. 5a, the memory retaining runner 61 comprises a forward projecting nose 77, which is inclined upwards and backwards, and the usefulness of which will be seen below. This nose 77 is flanked by two recessed front faces 77a, 77b, which are approximately vertical.

The device, which has just been described, operates as follows.

When a seat user wants to adjust the longitudinal position of this seat, he/she lifts the front end of the control bar 9, which causes the two catches 29 of the slide rails to unlock.

Figure 6:
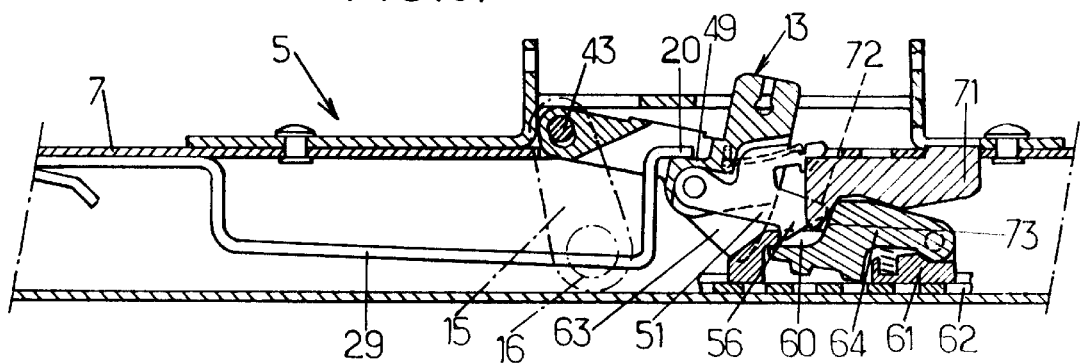
FIGS. 6 to 8 are similar views to FIG. 3, respectively during adjustment of the longitudinal position of the slide rail, when the slide rail is returned to its previously memorized position in the event of said memorized position being unfortunately lost, and during access to the rear seats of the vehicle.

As shown in FIG. 6, the rear end 20 of the slide rail catch which corresponds to the slider 13 then presses on the support sill 49 of said slider, which makes the rear end of the slider pivot downwards around the axis 43, until the main tip 56 of the clip 51 engages in the corresponding housing 60 of the memory retaining runner 61.

To advantage, the engagement of the main tip 56 in the corresponding housing 60 takes place before the teeth of the catch 29 are disengaged from the notches 24 of the fixed section.

The seat user can then adjust the longitudinal position of the seat part, by pulling the memory retaining runner 61 with the mobile section 7 of the slide rail which comprises this runner.

More exactly, the forward pulling of the memory retaining runner 61 is achieved by means of the main tip 56 of the clip 51, whereas the backward pulling of said memory retaining runner is achieved by engagement between, on the one hand, the rear face 63*a* of a stop pin 63 belonging to the slider, and on the other hand, the front face 77*b* of the memory retaining runner.

Furthermore, if for any reason, the memory retaining runner 61 has become disengaged from the mobile section 7 of the slide rail for example following an operational error (or during normal operation of the slide rail in the variant in FIG. 9 which will be described below), then said memory retaining runner 61 can possibly be re-attached to the mobile section during an adjustment of the longitudinal position of the whole seat, even without the user being aware of it.

Figure 7:
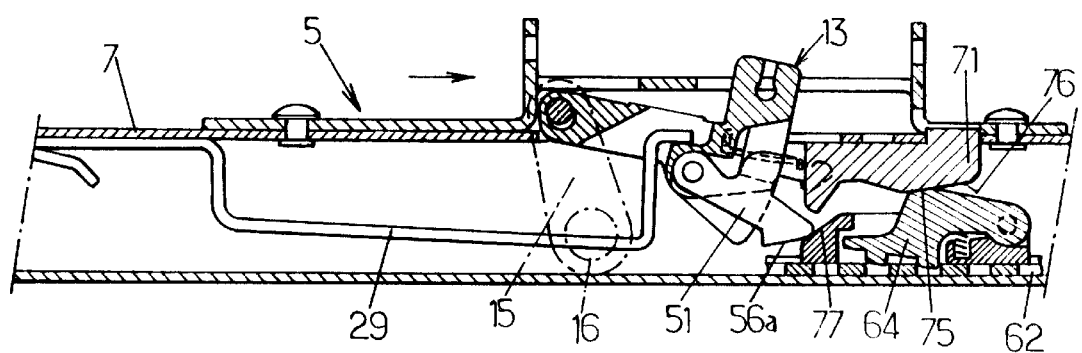

Indeed, in such a situation, as shown in FIG. 7, if the user adjusts backward the whole seat in a longitudinal position, then the cam surface 56*a* of the clip 51 engages with the nose 77 of the memory retaining runner to lift the clip 51, until the main tip 56 of said clip can engage in the corresponding housing 60 of the memory retaining runner, which puts the slide rail back in the position shown in FIG. 6.

When the memory retaining runner is being attached in this way, the cam surface 76 of the wedge 71 engages with the upper support surface 75 of the runner catch to place this catch in its locked position until the complete engagement of the main tip 56 in its housing 60, which prevents any sliding of the memory retaining runner along the rail 62.

Figure 8:
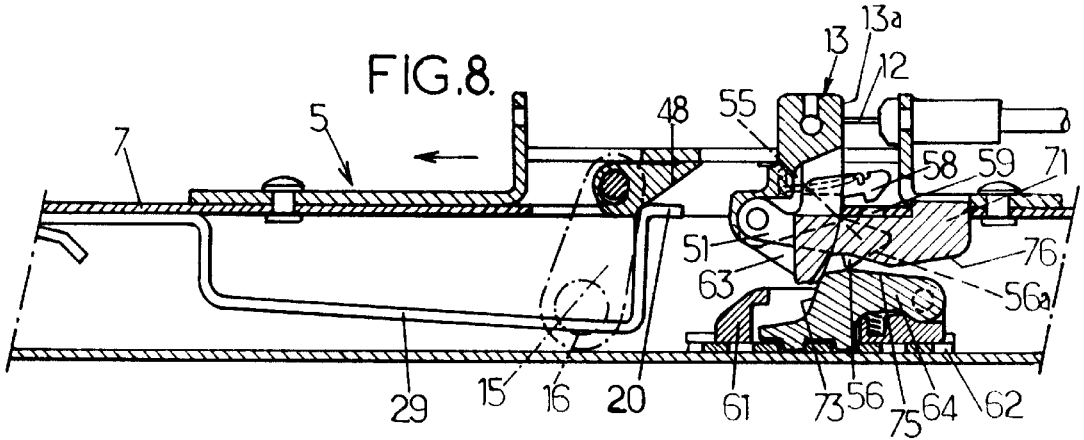

Lastly, as shown in FIG. 8, when it is required to access the rear seats of the vehicle or to leave these seats, the forward folding of the seat back causes a pull on the cable 12, which makes the slider 13 slide backwards.

Because of this sliding, the cam surface 48 of the slider acts on the support edge 20 of the corresponding slide rail catch to put this catch in its unlocked position.

Moreover, the sliding of the slider 13 makes the link 15 and the connection bar 16 pivot, which also unlocks the catch of the slide rail not comprising the slider 13.

Lastly, the cam surface 56*a* of the clip 51 engages with the front face 73 of the support catch 20 to make the clip 51 pivot upwards while making the runner catch 64 pivot downwards into its locked position, until the rear face 13*a* of the slider abuts against the end of the cut 36.

The main tip 56 of the clip 51 then comes to press on the upper support surface 75 of the runner catch, and the auxiliary tip 58 of the clip 51 is above the corresponding channel 59 arranged in the upper web 25 of the mobile section.

It will be noted that during this movement, the runner catch 64 is preferably put into its locked position before the slide rail catches have reached their unlocked position.

When the seat part of the seat is then moved forwards to give access to the rear seats or to leave these seats, the wedge 71 first of all continues to keep the runner catch 64 in its locked position, whereas the clip 51 can pivot downwards as soon as the main tip 56 has left the runner catch, which allows the auxiliary tip 58 of said clip to penetrate into the corresponding channel 59.

Thus, even if the user then puts the seat back upright again, the slider 13 is kept in its rear position by the auxiliary tip 58, so that the slide rails remain unlocked.

As soon as the mobile section 7 of the slide rail has been moved sufficiently forward, the wedge 71 no longer acts on the runner catch 64, and this catch returns to its unlocked position, the memory retaining runner 61 then retains its position simply by virtue of the friction between the runner and the rail 62.

When the seat part of the seat is then moved backwards to put the seat back into its initial position, the cam surface 76 of the wedge 71 firstly puts the runner catch back into its locked position, then the clip 51 is lifted by passing over the runner catch, which disengages the auxiliary tip 58 from the corresponding channel 59, whereas the stop pin 63 and/or 72 abut respectively against the memory retaining runner 61 and its catch 64.

The slider 13 can then return to its front position allowing the catches of the two slide rails to return to their locked position, as soon as the seat is again raised.

Figure 9:
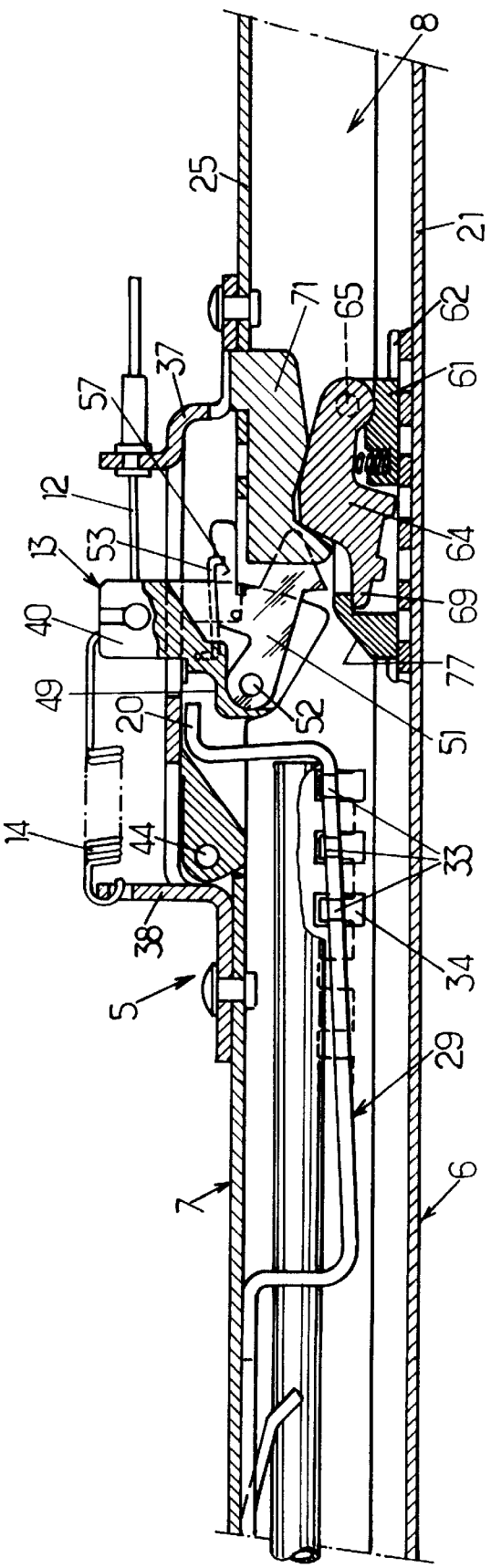
FIG. 9 is a similar view to FIG. 3, for a variant of the invention.

Clearly, the invention is not limited to the particular example, which has just been described. It encompasses on the contrary all its variants, and particularly:

those in which the auxiliary tip 58 of the clip 51 is eliminated, as shown in FIG. 9, in which case the slide rails are immediately re-locked when a user puts the seat back upright again during access to the rear seats of the vehicle, even if the seat has not returned to its initial position, and those in which the two slide rails 5 of the seat are identical and each controlled by a sheathed cable.

We claim:

1. A slide rail for a vehicle seat, comprising:

a fixed section intended to be fixed to the vehicle, a mobile section which is slidingly mounted along the fixed section and which is intended to be fixed to the seat to allow movement of this seat in a so-called longitudinal direction, forwards and backwards, the mobile section delimiting with the fixed section a hollow inner space in the slide rail, a slide rail catch which is mounted on the mobile section and which is movable between, on the one hand, a locked position wherein said slide rail catch engages with the fixed section to lock the mobile section, and on the other hand, an unlocked position wherein said slide rail catch does not engage with the fixed section and allows said mobile section to slide, the slide rail catch being resiliently biased to its locked position, a memory retaining runner which is slidingly mounted relative to the fixed section parallel to the longitudinal direction, this memory retaining runner being placed in the inner space of the slide rail and defining a memorized position of the mobile section, a runner catch which is carried by the memory retaining runner and which is movable between, on the one hand, a locked position wherein said runner catch engages with notches integral with the fixed section so as to immobilize the memory retaining runner relative to the fixed section, and on the other hand, an unlocked position wherein said runner catch does not immobilize the memory retaining runner, a runner lock-on device which is mounted on the mobile section and which is movable between, on the one hand, an attached position wherein said lock-on device fixes the memory retaining runner to the mobile section, and on the other hand, an unattached position wherein said lock-on device does not fix the memory retaining runner to the mobile section, first control means the slide rail in a first unlocked state wherein the slide rail catch is in its unlocked position and the lock-on device is in its attached position, so as to allow simultaneous sliding of the mobile section and the memory retaining runner relative to the fixed section, either forwards or backwards, in order to adjust the memorized position of the seat, and second control means the slide rail in a second unlocked state wherein the slide rail catch is in its unlocked position and the lock-on device is in its unattached position, so as to allow forward sliding of the mobile section without moving the memory retaining runner, wherein the memory retaining runner engages by friction fitting, with a longitudinal guide integral with the fixed section, wherein the runner catch is resiliently biased to its unlocked position by a spring mounted on the memory retaining runner, and wherein the mobile section of the slide rail comprises a wedge which projects into the hollow inner space of said slide rail, this wedge having at least a cam surface which is adapted to engage with a support surface belonging to the runner catch, said cam surface being configured so as to leave the runner catch in its unlocked position when the mobile section of the slide rail is in its memorized position, and to move the runner catch into its locked position when the mobile section is not in its memorized position, at least when said mobile section leaves its memorized position or returns to said memorized position, and the friction between the memory retaining runner and said guide being significant enough for the action of the wedge cam surface on the runner catch support surface not to cause any longitudinal sliding of the memory retaining runner.

2. A slide rail according to claim 1, wherein the wedge cam surface is configured so as to move the runner catch into its locked position only when the mobile section of the slide rail is shifted forwards from its memorized position, at a distance from said memorized position less than a pre-specified distance, which pre-specified distance is less than 1 cm, in such a way that the runner catch is in its locked position only when the mobile section has just left its memorized position or is returning to said memorized position.

3. A slide rail according to claim 1, wherein the slide rail catch is a resilient metal part contained in the hollow inner space of said slide rail.

4. A slide rail according to claim 1, wherein the fixed section comprises a horizontal bottom which carries the memory retaining runner, the mobile section having a horizontal upper web which is integral with said wedge and which carries a slider mounted to slide longitudinally relative to said mobile section between front and rear positions, this slider having a front end and a rear end, and the front end of said slider being pivotally mounted relative to the mobile section around a first horizontal transverse axis, in such a way that this slider is movable between a position parallel to said mobile section and a position inclined towards the hollow inner space of the slide rail, said rear end carrying a clip which is pivotally mounted relative to said slider around a second transverse horizontal axis, between high and low positions, this clip being resiliently biased towards its low position and having a downward pointing tip which is adapted to penetrate in a housing belonging to the memory retaining runner when the slider is in its inclined position relative to the mobile section and when said mobile section is in its memorized position, the slider and its clip thus forming said lock-on device, the slider comprising additionally a cam surface which engages with the slide rail catch to move said slide rail catch from its locked position when the slider moves from its front position to its rear position under the action of the second control means, the slide rail comprising furthermore a support sill which is adapted to act on a complementary support surface belonging to the slider when the slide rail catch is moved into its unlocked position under the action of the first control means, and the slider being pulled resiliently to both its rear position and its horizontal position.

5. A slide rail according to claim 4, wherein the slider is pulled to both its rear position and its horizontal position by the same tension spring which is mounted between on the one hand, a support lug which is integral with the mobile section of the slide rail and which is placed above the level of the pivoting axis of the slider, and on the other hand, an upper head placed towards the front end of said slider.

6. A slide rail according to claim 4, wherein the clip is configured to engage in the housing of the memory retaining runner before the slide rail catch allows the mobile section to slide, when the first control means are activated.

7. A slide rail according to claim 4, wherein the clip is configured to allow the memory retaining runner to be driven forward when said clip is engaged in the corresponding housing of the runner, the memory retaining runner being furthermore in contact with a stop integral with the mobile section when said mobile section is in its memorized position, said stop being placed towards the front of the memory retaining runner and allowing this runner to be driven backwards when the first control means are activated.

8. A slide rail according to claim 4, wherein the clip has a rear end including a clip cam surface which engages with the runner catch when the second control means are activated, to then move the runner catch into its locked position whereas the clip moves into its high position relative to the slider.

9. A slide rail according to claim 8, wherein the cam surface of the clip is configured so that, when the second control means are activated, the runner catch moves into its locked position before the slide rail catch allows the mobile section to slide.

10. A slide rail according to claim 8, wherein the memory retaining runner has a front edge which is configured so that, when the slider is in its inclined position and the clip is in its low position, if the clip is not engaged in the corresponding housing of the memory retaining runner, then the cam surface of said clip is adapted to slide against the inclined front edge of the memory retaining runner when the mobile section is moved backwards, thus lifting the clip until the tip of said clip is engaged in the corresponding housing of the memory retaining runner.

11. A slide rail according to claim 8, wherein the clip is integral with an auxiliary tip which, when the slider is moved into its rear position under the action of the second control means, is above a housing arranged in the upper web of the mobile section, this auxiliary tip being adapted to engage in the corresponding housing when the mobile section leaves its memorized position and the clip cam surface ceases to engage with the memory retaining runner, said auxiliary tip being adapted to then hold the slider in its rear position until the mobile section returns to its memorized position, where the clip cam surface again raises said clip and releases the auxiliary tip from its housing.

12. A vehicle seat comprising a seat part longitudinally slidingly mounted by means of at least a first slide rail for a vehicle seat, comprising:

a fixed section which is fixed to the vehicle, a mobile section which is slidingly mounted along the fixed section and which is fixed to the seat part to allow movement of this seat part in a so-called longitudinal direction, forwards and backwards, the mobile section delimiting with the fixed section a hollow inner space in the slide rail, a slide rail catch which is mounted on the mobile section and which is movable between, on the one hand, a locked position wherein said slide rail catch engages with the fixed section to lock the mobile section, and on the other hand, an unlocked position wherein said slide rail catch does not engage with the fixed section and allows said mobile section to slide, the slide rail catch being resiliently biased to its locked position, a memory retaining runner which is slidingly mounted relative to the fixed section parallel to the longitudinal direction, this memory retaining runner being placed in the inner space of the slide rail defining in this way a memorized position of the mobile section, a runner catch which is carried by the memory retaining runner and which is movable between, on the one hand, a locked position wherein said runner catch engages with notches integral with the fixed section so as to immobilize the memory retaining runner relative to the fixed section, and on the other hand, an unlocked position wherein said runner catch does not immobilize the memory retaining runner, a runner lock-on device which is mounted on the mobile section and which is movable between, on the one hand, an attached position wherein said lock-on device fixes the memory retaining runner to the mobile section, and on the other hand, an unattached position wherein said lock-on device does not fix the memory retaining runner to the mobile section, first control means adapted to put the first slide rail in a first unlocked state wherein the slide rail catch is in its unlocked position and the lock-on device in its attached position, so as to allow simultaneous sliding of the mobile section and the memory retaining runner relative to the fixed section, either forwards or backwards, in order to adjust the memorized position of the seat, and second control means adapted to put the first slide rail in a second unlocked state wherein the slide rail catch is in its unlocked position and the lock-on device is in its unattached position, so as to allow forward sliding of the mobile section without moving the memory retaining runner, wherein the memory retaining runner engages by friction fitting, with a longitudinal guide integral with the fixed section, wherein the runner catch is resiliently biased to its unlocked position by a spring mounted on the memory retaining runner, and wherein the mobile section of the slide rail comprises a wedge which projects into the hollow inner space of said slide rail, this wedge having at least a cam surface which is adapted to engage with a support surface belonging to the runner catch, said cam surface being configured so as to leave the runner catch in its unlocked position when the mobile section of the first slide rail is in its memorized position, and to move the runner catch into its locked position when the mobile section is not in its memorized position, at least when said mobile section leaves its memorized position or returns to said memorized position, and the friction between the memory retaining runner and said guide being significant enough for the action of the wedge cam surface on the runner catch support surface not to cause any longitudinal sliding of the memory retaining runner.

13. A vehicle seat according to claim 12, wherein the fixed section comprises a horizontal bottom which carries the memory retaining runner, the mobile section having a horizontal upper web which is integral with said wedge and which carries a slider mounted to slide longitudinally relative to said mobile section between front and rear positions, this slider having a front end and a rear end, and the front end of said slider pivotally mounted relative to the mobile section around a first horizontal transverse axis, in such a way that this slider is movable between a position parallel to said mobile section and a position inclined towards the hollow inner space of the first slide rail, said rear end carrying a clip which is pivotally mounted relative to said slider around a second transverse horizontal axis, between high and low positions, this clip being resiliently biased towards its low position and having a downward pointing tip which is adapted to penetrate in a housing belonging to the memory retaining runner when the slider is in its inclined position relative to the mobile section and when said mobile section is in its memorized position, the slider and its clip thus forming said lock-on device, the slider comprising additionally a cam surface which engages with the slide rail catch to move said slide rail catch from its locked position to its unlocked position when the slider moves from its front position to its rear position under the action of the second control means, the first slide rail comprising furthermore a support sill which is adapted to act on a complementary support surface belonging to the slider when the slide rail catch is moved into its unlocked position under the action of the first control means, and the slider being pulled resiliently to both its rear position and its horizontal position, the seat further comprising a second slide rail also including a fixed section which is fixed to the vehicle, a mobile section which is fixed to the seat part, and a slide rail catch movable between locked and unlocked positions, the slider of the first slide rail being connected by means of a link, to a transverse connection bar which is pivotally mounted on the mobile sections of the two slide rails and which comprises a support sill engaging with the slide rail catch of the second slide rail to move said second slide rail catch into its unlocked position when the second control means are activated.

* * * * *